(12) United States Patent
Park (10) Patent No.: US 10,458,484 B2
(45) Date of Patent: Oct. 29, 2019

(54) DUAL CLUTCH

(71) Applicant: C-STONE TECHNOLOGIES CO., LTD., Suwon-si (KR)

(72) Inventor: Dong-Hoon Park, Seongnam-si (KR)

(73) Assignee: C-STONE TECHNOLOGIES CO., LTD., Suwon-si (KR)

( * ) Notice: Subject to any disclaimer, the term of this patent is extended or adjusted under 35 U.S.C. 154(b) by 105 days.

(21) Appl. No.: 15/757,739

(22) PCT Filed: May 19, 2016

(86) PCT No.: PCT/KR2016/005322
§ 371 (c)(1),
(2) Date: Mar. 6, 2018

(87) PCT Pub. No.: WO2017/052024
PCT Pub. Date: Mar. 30, 2017

(65) Prior Publication Data
US 2019/0048943 A1 Feb. 14, 2019

(30) Foreign Application Priority Data

Sep. 22, 2015 (KR) .......................... 10-2015-0133933
Apr. 18, 2016 (KR) .......................... 10-2016-0047075

(51) Int. Cl.
*F16D 21/06* (2006.01)
*F16D 25/0638* (2006.01)
(Continued)

(52) U.S. Cl.
CPC ......... *F16D 21/06* (2013.01); *F16D 25/0638* (2013.01); *F16D 25/10* (2013.01);
(Continued)

(58) Field of Classification Search
None
See application file for complete search history.

(56) References Cited

U.S. PATENT DOCUMENTS

| | | |
|---|---|---|
| 4,971,185 A | 11/1990 | Hayakawa et al. |
| 2007/0240961 A1 | 10/2007 | Gremplini |

(Continued)

FOREIGN PATENT DOCUMENTS

| | | |
|---|---|---|
| CN | 102555788 | 7/2012 |
| EP | 2532912 | 12/2012 |

(Continued)

OTHER PUBLICATIONS

EPO, The extended European Search Report of EP 16848750.2 dated Mar. 29, 2019.

(Continued)

*Primary Examiner* — Timothy Hannon
(74) *Attorney, Agent, or Firm* — Lex IP Meister, PLLC (57) ABSTRACT

The present invention relates to a dual clutch which can transmit rotational power of a first clutch housing to a second clutch housing through a first piston for operating the first clutch, thereby reducing the number of parts and reducing production cost.
The dual clutch outputting rotational power of an input shaft to a first output shaft or a second output shaft, includes: a cylindrical transmission housing having a space therein; a first clutch disposed at a radial outer side within the transmission housing and adapted to selectively transmit the rotational power of the input shaft to the first output shaft; and a second clutch disposed radially inward of the first clutch within the transmission housing and adapted to selectively transmit the rotational power of the input shaft to the second output shaft, and the dual clutch further includes a first piston selectively actuating the first clutch, and the first piston is adapted to continuously transmit the rotational power of the input shaft transmitted to the first clutch to the second clutch.

20 Claims, 3 Drawing Sheets (51) Int. Cl.
*F16D 25/12* (2006.01)
*F16D 25/10* (2006.01)

(52) U.S. Cl.
CPC ...... *F16D 25/12* (2013.01); *F16D 2021/0607* (2013.01); *F16D 2021/0661* (2013.01)

(56) References Cited

U.S. PATENT DOCUMENTS

| | | |
|---|---|---|
| 2011/0088989 A1 | 4/2011 | Agner |
| 2013/0025995 A1 | 1/2013 | Krebs et al. |

FOREIGN PATENT DOCUMENTS

| | | |
|---|---|---|
| JP | 07-94855 | 10/1995 |
| JP | 2005-133937 | 5/2005 |
| JP | 4473118 | 9/2005 |
| JP | 2014-101927 | 6/2014 |
| KR | 10-2005-0032012 | 4/2005 |
| KR | 10-2006-0046484 | 5/2006 |
| KR | 10-2006-0048327 | 5/2006 |
| KR | 10-1080286 | 11/2011 |

OTHER PUBLICATIONS

WIPO, PCT Search Report & Written Opinion of PCT/KR2016/005322 dated Aug. 26, 2016.

DUAL CLUTCH

TECHNICAL FIELD

The present invention relates to a dual clutch, and more particularly, to a dual clutch which can transmit rotational power of a first clutch housing to a second clutch housing through a first piston for operating the first clutch, thereby reducing the number of parts and reducing production cost.

BACKGROUND ART

Eco-friendly technology in vehicles is a core technology with survival of a future automobile industry and automobile makers devote all their energy to developing environmentally friendly vehicles to achieve environmental and fuel efficiency regulations. Further, studies on a double clutch transmission or dual clutch transmission (DCT) as a transmission that can be applied to the environmentally friendly automobile are being actively conducted. The DCT is designed to improve efficiency and convenience by applying two clutches to a manual transmission structure.

That is, the DCT is a transmission in which a shift is performed while alternately operating an odd-numbered stage and an even-numbered stage by using two clutches and a mechanism for alternately operating the odd-numbered stage and the even-numbered stage can improve a torque disconnection sense in shifting, which is caused by the manual transmission (MT) in the related art and facilitate a shift operation.

The DCT is provided with two clutches for selectively transmitting rotational power of an input shaft to first and second output shafts. Two clutches are prevented from interfering with each other in operation and due to structural considerations, one clutch receives the rotational power of the input shaft and the rotational power of the input shaft is together transmitted to two clutches by connecting one clutch and the other clutch to a power transmission member in the related art. In addition, a piston or a diaphragm spring for operating each clutch is provided separately from the power transmission member.

According to the related art, various means have been applied to prevent interference between the power transmission member and the piston or the diaphragm spring, but there has been a problem that the number of parts increases and a structure becomes complicated.

DISCLOSURE

Technical Problem

Accordingly, the present invention is created to solve the problem and the present invention has been made in an effort to provide a dual clutch which can transmit rotational power of a first clutch housing to a second clutch housing through a first piston for operating the first clutch, thereby reducing the number of parts and reducing production cost.

The present invention has also been made in an effort to provide a dual clutch capable of solving a problem that may occur when power can be transmitted to the second clutch housing through the first piston and eliminating a return spring and reducing drag torque.

The present invention has also been made in an effort to provide a dual clutch suitable for alternately operating the first clutch and the second clutch by using hydraulic pressure.

Particularly, the present invention provides a dual clutch in which when operating hydraulic pressure is supplied to one operating piston chamber, discharge of the operating hydraulic pressure supplied to the other operating piston chamber is smoothly performed, so that an alternating operation is smooth and a hydraulic working area of a piston can be increased, thereby lowering the operating hydraulic pressure and facilitating processing of a housing.

Technical Solution

An exemplary embodiment of the present invention provides a dual clutch adapted to output rotational power of an input shaft to a first output shaft or a second output shaft.

The dual clutch includes: a cylindrical transmission housing having a space therein; a first clutch disposed radially outward within the transmission housing and adapted to selectively transmit the rotational power of the input shaft to the first output shaft; and a second clutch disposed at a radial outer side of the first clutch within the transmission housing and adapted to selectively transmit the rotational power of the input shaft to the second output shaft, and the dual clutch further includes a first piston selectively actuating the first clutch, and the first piston is adapted to continuously transmit the rotational power of the input shaft transmitted to the first clutch to the second clutch.

The first clutch may include a first clutch housing operatively connected to the input shaft and rotating together with the input shaft, and the second clutch may include a second clutch housing operatively connected to the first clutch housing through the first piston and rotating together with the first clutch housing.

The first piston may be spline-coupled to an inner peripheral surface of the first clutch housing and the second clutch housing may be joined to the first piston.

The first clutch housing may include a first disk part coupled to the input shaft on an inner end thereof and extending radially outward and a first cylinder part extending axially rearward from an outer end of the first disk part.

The first clutch may include a plurality of first separate plates spline-coupled to the inner peripheral surface of the first cylinder part, a first actuating hub operatively coupled to the first output shaft, and a plurality of first friction disks spline-coupled to an outer peripheral surface of the first actuating hub and disposed alternately with the plurality of first separate plates.

The first clutch may further include at least one first separating spring disposed between neighboring first separate plates at a radial outer side of the plurality of first friction masks.

A first support part axially supporting the first separate plate may be formed at the radial outer side of the first disk part and an outer end of the first piston adapted to provide axial force to the first separate plate may be spline-coupled to a rear inner peripheral surface of the first cylinder part.

The second clutch housing may be joined to the first piston at a radial inner side of the first clutch, and the second clutch may include a plurality of second friction disks spline-coupled to the inner peripheral surface of the second clutch housing, a second actuating hub operatively coupled to the second output shaft, and a plurality of second separate plates spline-coupled to an outer peripheral surface of the second actuating hub and disposed alternately with the plurality of second friction disks.

The second clutch may further include at least one second separating spring disposed between neighboring second separate plates at the radial inner side of the plurality of second friction disks.

A second support part axially supporting the second separate plate may be formed on a front outer peripheral surface of the second actuating hub and an outer end of a second piston adapted to provide the axial force to the second separate plate may be spline-coupled to a rear inner peripheral surface of the second clutch housing.

In one aspect, the dual clutch may further include an actuator disposed in the transmission housing and providing actuation force to the first piston and a second piston and the actuator may include a first actuating part providing the actuation force to the first piston through a first release bearing, and a second actuating part providing the actuation force to the second piston through a second release bearing.

The actuator may be provided with a first supply passage adapted to supply actuating hydraulic pressure to the first actuating part, a second supply passage adapted to supply the actuating hydraulic pressure to the second actuating part, and a third supply passage for lubrication and cooling therein.

In another aspect, the dual clutch may further include an actuator disposed in the transmission housing and providing actuation force to the first piston and the second piston, and the actuator may include an actuator housing including an inner periphery and a protrusion of an actuator housing, which are radially spaced apart from each other and protrude axially and forming an actuating piston space between the inner periphery and the protrusion of the actuator housing, a first actuating piston mounted in the actuating piston space and providing the axial force to the first piston through a first release bearing, and a second actuating piston mounted in the actuating piston space and providing the actuation force to the second piston through a second release bearing.

The second actuating piston may include a second actuating piston inner periphery which is in close contact with the inner periphery of the actuator housing and extending axially and a second actuating piston disk part which extends radially outward from a rear end of the inner periphery of the second actuating piston and is in close contact with the housing protrusion, and the inner peripheral surface of the first actuating piston may be in close contact with the inner periphery of the second actuating piston and the outer peripheral surface may be in close contact with the housing protrusion.

A first actuating piston chamber may be formed among the first actuating piston, the second actuating piston inner periphery, and the housing protrusion, and a second actuating piston chamber may be formed between the second actuating piston and the actuator housing.

The actuator housing may be provided with a first supply passage adapted to supply actuating hydraulic pressure to the first actuating piston chamber, a second supply passage adapted to supply the actuating hydraulic pressure to the second actuating piston chamber, and a third supply passage for lubrication and cooling therein.

The actuator may further include a return spring for providing elastic force to the first actuating piston, and the return spring may be axially supported by at least one spring seat fixedly mounted on the inner periphery of the actuator housing.

At least one mounting hole may be formed in a circumferential direction in the inner periphery of the second actuating piston and a step part having a small diameter may be formed on the inner periphery of the actuator housing, and at least one spring seat may be mounted on the inner periphery of the actuator housing by penetrating at least one mounting hole and axially supported by the step part and a snap ring.

In yet another aspect, the actuator may further include an additional spring seat interposed between the return spring and the first actuating piston at an opposite side to the spring seat, and at least a part of the additional spring seat may be inserted into the mounting hole and mounted to be movable axially.

A front cover may be mounted between the transmission housing and the input shaft at an axial front side of the first clutch housing.

A sealing member and a bearing may be mounted between the inner peripheral surface of the front cover and the outer peripheral surface of the input shaft sequentially from the front side to the rear side.

A second lubrication passage for supplying lubrication oil to the bearing may be formed at a position of the first clutch housing corresponding to the bearing.

The bearing may be mounted between the inner peripheral surface of the actuator and the inner periphery of the second actuating hub and the sealing member may be formed between the inner peripheral surface of the actuator and the outer peripheral surface of the second output shaft at the rear side of the bearing.

A passage connection hole for supplying lubrication oil to the bearing may be formed in the actuator.

The bearings may be disposed between the inner periphery of the first clutch housing and the inner periphery of the first actuating hub and between the inner periphery of the first actuating hub and the inner periphery of the second actuating hub, respectively.

Advantageous Effects

As described above, according to the exemplary embodiment of the present invention, rotational power of a first clutch housing is transmitted to a second clutch housing through a first piston for operating the first clutch, thereby reducing the number of parts and reducing production cost.

Further, by using a separating spring, drag torque generated by viscosity of cooling and lubricating oil when the first clutch and a second clutch are released can be reduced.

In addition, by using the separating spring, a return spring can be eliminated, and space utilization in a dual clutch can be improved.

Further, when operating hydraulic pressure is supplied to a first operating piston chamber, the operating hydraulic pressure supplied to a second operating piston chamber is smoothly discharged and when the operating hydraulic pressure is supplied to the second operating piston chamber, the operating hydraulic pressure supplied to the first operating piston chamber is smoothly discharged, so that an alternate operation can be smoothly performed. In addition, the hydraulic working area of the piston can be increased to lower the operating hydraulic pressure and a housing can be easily processed, thereby reducing production cost.

MODE FOR INVENTION

An exemplary embodiment of the present invention will hereinafter be described in detail with reference to the accompanying drawings.

A dual clutch according to an exemplary embodiment of the present invention may be used, for example, in a double clutch transmission or a dual clutch transmission (DCT). In the dual clutch transmission, a plurality of input gears is dispersedly disposed on two input shafts, and a plurality of output gears each gear-coupled with the plurality of input gears is dispersedly disposed on two output shafts. In addition, the dual clutch transmission includes a plurality of synchronizer mechanisms and the plurality of synchronizer mechanisms selectively operates to connect one of the plurality of output gears and one of two output shafts. Further, the dual clutch is adapted to transmit power of a power source (e.g., an engine or a motor) to one of two output shafts. As the dual clutch, a dry or wet clutch may be used.

Meanwhile, it should be understood that the input shaft and first and second output shafts in the present specification and claims are related to the flow of power in terms of the dual clutch. That is, the input shaft means a shaft for inputting rotational power to the dual clutch, and may be a crankshaft of an engine, a motor shaft of a drive motor, or a separate shaft connected thereto and the output shaft means a shaft outputting the rotational power from the dual clutch and may be a transmission input shaft, or the like.

In addition, a fact that two members are 'operatively connected' means that the members are connected so that the rotational power of one member may be transmitted to the other members and means that two members are connected to be rotatable together with each other through means such as welding, bolts, rivets, spline coupling, gear coupling, or the like.

Further, for easy description, a side (that is, a left side in a drawing) close to the power source is referred to as 'front end', 'front', 'front side', or a representation similar thereto and a side (that is, a right side in the drawing) far from the power source is referred to as 'rear end', 'rear', 'rear side', or a representation similar thereto.

Figure 1:
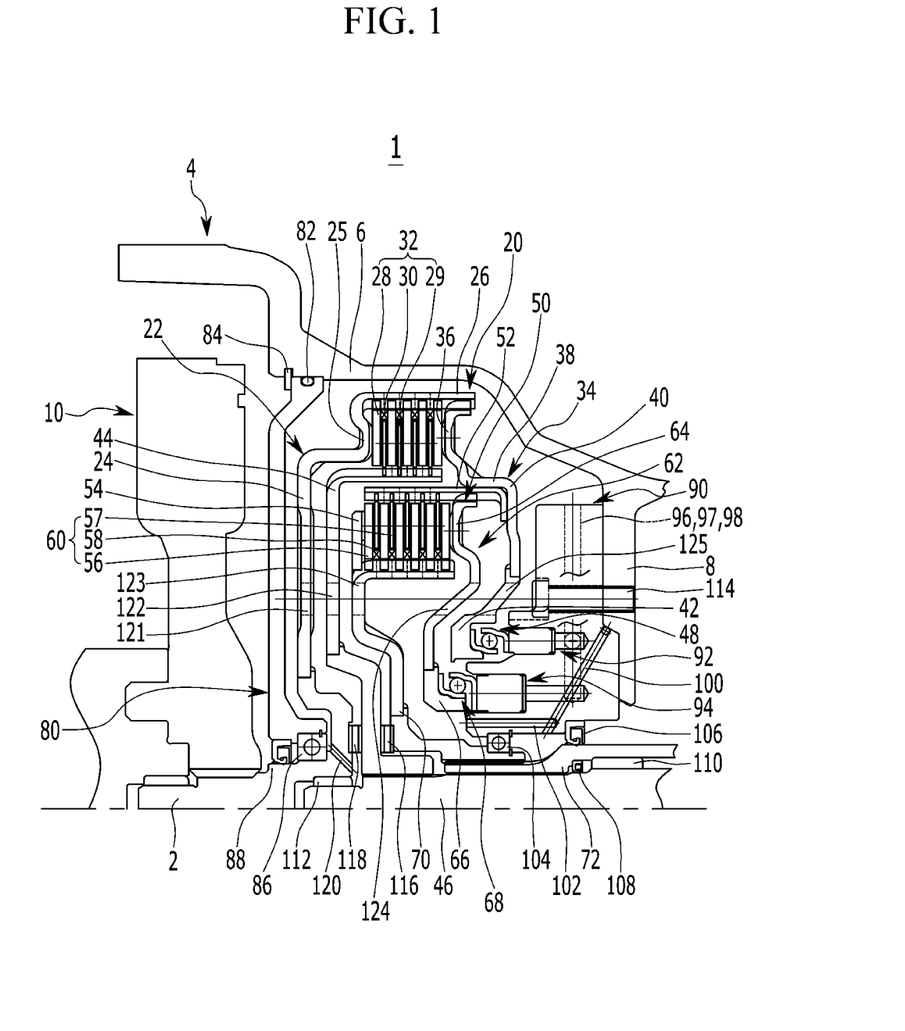
FIG. 1 is a cross-sectional view of a dual clutch according to an exemplary embodiment of the present invention.

FIG. 1 is a cross-sectional view of a dual clutch according to an exemplary embodiment of the present invention.

As illustrated in FIG. 1, the dual clutch 1 according to the exemplary embodiment of the present invention is used for selectively transmitting the rotational power of an input shaft 2 to a first output shaft 46 or a second output shaft 72 and includes a first clutch 20, a second clutch 50, and an actuator 90. The first clutch 20, the second clutch 50, and the actuator 90 are disposed inside a transmission housing 4. The transmission housing 4 is formed in a generally cylindrical shape with a space therein and includes a transmission housing outer peripheral surface 6 and a transmission housing rear surface 8. As mentioned above, the present specification is described in terms of the dual clutch and it should be understood that the transmission housing rear surface 8 does not mean a rear surface of an actual transmission housing, but means a rear surface of the transmission housing 6 on which the dual clutch 1 is mounted.

The input shaft 2, the first output shaft 46, and the second output shaft 72 are disposed at the center in the transmission housing 4. Herein, any one of the first output shaft 46 and the second output shaft 72 is related to implementation of an odd-numbered stage (for example, a first stage, a third stage, a fifth stage, a seventh stage, etc.) and the other one of the first output shaft 46 and the second output shaft 72 is related to implementation of an even-numbered stage (for example, a second stage, a fourth stage, a sixth stage, an eighth stage, etc.). That is, the rotational power of the input shaft 2 is selectively transmitted to the first output shaft 46 or the second output shaft 72 through the operation of the first clutch 20 or the second clutch 50, and as a result, shifting is performed while alternately implementing the odd-numbered stage and the even-numbered stage.

The input shaft 2 is used for inputting the rotational power of the power source (e.g., the engine or motor) into the dual clutch 1 and may be a crankshaft or a motor shaft or a separate shaft connected thereto. In the exemplary embodiment, the input shaft 2 is illustrated as a shaft connected to the crankshaft or the motor shaft through a torsional damper 10, but is not limited thereto.

The first output shaft 46 and the second output shaft 72 may be two input shafts provided in the dual clutch transmission, respectively. The second output shaft 72 is formed as a hollow shaft and the first output shaft 46 is disposed inside the second output shaft 72 without rotating interference with the second output shaft 72. Further, the front end of the first output shaft 46 protrudes axially forward from the front end of the second output shaft 72 and extends to the end of the input shaft 2. A bearing 112 is disposed between the end of the input shaft 2 and the front end of the first output shaft 46 to facilitate relative rotation between the input shaft 2 and the first output shaft 46. Further, a bearing 110 is disposed between the rear end of the first output shaft 46 and the rear end of the second output shaft 72 to facilitate the relative rotation between the first output shaft 46 and the second output shaft 72. A sealing member 108 is disposed between the rear end of the first output shaft 46 and the rear end of the second output shaft 72 to the front side of the bearing 110 to prevent lubricating oil supplied to the dual clutch from leaking to the outside. Splines or gear teeth are formed on the outer peripheral surface of the front end of the first output shaft 46 and the splines or gear teeth are formed on the outer peripheral surface of the front end of the second output shaft 72, but the present invention is not limited thereto.

The torsional damper 10 is used for attenuating torsional vibration of the rotational power transmitted from the crankshaft or the motor shaft. Since a configuration of the torsional damper 10 is well known to those skilled in the art, a description thereof will be omitted in the present specification. An output of the torsional damper 10 is transmitted to the input shaft 2.

The first clutch 20 is disposed at a radial outer side within the transmission housing 4. That is, the first clutch 20 is disposed close to the transmission housing outer peripheral surface 6. The first clutch 20 is used for selectively transmitting the rotational power of the input shaft 2 to the first output shaft 42 and includes a first clutch housing 22, a first disk pack 32, a first piston 34, and a first actuating hub 44.

An inner side of the first clutch housing 22 is operatively coupled to the input shaft 2 and extends radially outward to form a space in which components constituting the first clutch 20 may be mounted. The first clutch housing 22 includes a first disk part 24 extending in a radial direction, a first support part 25 formed on an outer end of the first disk part 24 and configured to support the first disk pack 32 in an axial direction, and a first cylindrical part 26 extending axially rearward from the outer end of the first support part 25. A shape of the first clutch housing 22 may be determined by those skilled in the art according to a design intention and is not limited to the shape shown in the specification and the drawings.

The first disk pack 32 is disposed between the first clutch housing 22 and the first actuating hub 44 to selectively transmit the rotational power of the first clutch housing 22 to the first actuating hub 44. The first disk pack 32 includes a first separate plate 28, a first friction disk 29, and a first separating spring 30. The first disk pack 32 is not limited thereto, but the first separating spring 30 may be deleted as necessary.

A plurality of first separate plates 28 is spline-coupled to an inner peripheral surface of the first cylindrical part 26.

A plurality of first friction disks 29 is spline-coupled to the outer peripheral surface of the first actuating hub 44 and arranged alternately with the plurality of first separate plates 28.

At least one first separating spring 30 is disposed between the neighboring first separate plates 28 outside a radius of the first friction disk 29 to provide axial elastic force to the first separate plate. The first separating spring 30 maintains an interval between the first separate plates 28 during disengagement of the first clutch 20 so as to reduce drag torque and facilitate release of the first clutch 20.

The first piston 34 selectively frictionally couples the first disk pack 32 to selectively transmit the rotational power of the first clutch housing 22 to the first actuating hub 44. The first piston 34 is spline-coupled to the inner peripheral surface of the first cylindrical part 26 from a rear side of the plurality of first separate plates 28 to be movable in the axial direction and includes a first pressing part 36, a first connection part 38, a first radial extension part 40, and a first receiving part 42.

The first pressing part 36 is formed at a radial outer portion of the first piston 34 at a corresponding position of the first separate plate 28. The first pressing part 36 applies axial force to the first separate plate 28 to frictionally couple the first separate plate 28 and the first friction disk 29 to each other.

The first connection part 38 is formed on the radial inner side of the first pressing part 36 and is adapted to transmit power of the first clutch housing 22 to the second clutch 50.

The first radial extension part 40 is formed at a radial inner side of the first connection part 38 and extends to the actuator 90.

The first receiving part 42 is formed at the radial inner portion of the first radial extension part 40 and is adapted to receive a first release bearing 48.

The shape of the first piston 34 may be determined by those skilled in the art according to the design intention and is not limited to the shape shown in the specification and the drawings.

The first actuating hub 44 transmits the rotational power of the first clutch housing 22 transmitted through the first disk pack 32 to the first output shaft 46. The splines or gear teeth are formed on the inner peripheral surface of the first actuating hub 44 so that power may be transmitted by engaging with the splines or gear teeth of the first output shaft 46. A bearing 118 is interposed between the radial inner portion of the first actuating hub 44 and the radial inner portion of the first clutch housing 22 to facilitate the relative rotation of the first actuating hub 44 and the first clutch housing 22 and axially support the first actuating hub 44.

The second clutch 50 is disposed at the radial inner side of the first clutch 20 within the transmission housing 4. The second clutch 50 is connected to the first clutch housing 22 to continuously receive the rotational power of the first clutch housing 22 and selectively transmit the rotational power to the second output shaft 72 and includes a second clutch housing 52, a second disk pack 60, a second piston 62, a second actuating hub 70, and a second support part 54.

The second clutch housing 52 is formed in a cylindrical shape to form a space in which the components constituting the second clutch 50 may be mounted. The second clutch housing 52 is joined to the first connection part 38 of the first piston 34 to continuously receive the rotational power of the first clutch housing 22. The shape of the second clutch housing 52 may be determined by those skilled in the art according to the design intention and is not limited to the shape shown in the specification and the drawings.

The second disk pack 60 is disposed between the second clutch housing 52 and the second actuating hub 70 to selectively transmit the rotational power of the second clutch housing 52 to the second actuating hub 70. The second disk pack 60 includes a second separate plate 56, a second friction disk 57, and a second separating spring 58. The second disk pack 60 is not limited thereto, but the second separating spring 58 may be deleted as necessary.

A plurality of second separate plates 56 is spline-coupled to the outer peripheral surface of the second actuating hub 70.

A plurality of second friction disks 57 is spline-coupled to the inner peripheral surface of the second clutch housing 52 and arranged alternately with the plurality of second separate plates 56.

At least one second separating spring 58 is disposed between the neighboring second separate plates 56 inside the radius of the second friction disk 57 to provide the axial elastic force to the second separate plate. The second separating spring 58 maintains the interval between the second separate plates 56 during disengagement of the second clutch 50 so as to reduce the drag torque and facilitate the release of the second clutch 50.

The second piston 62 selectively frictionally couples the second disk pack 60 to selectively transmit the rotational power of the second clutch housing 52 to the second actuating hub 70. The second piston 62 is spline-coupled to the inner peripheral surface of the second clutch housing 52 at the rear side of the plurality of second separate plates 56 to be movable in the axial direction and includes a second pressing part 64 and a second receiving part 66.

The second pressing part 64 is formed at the radial outer portion of the second piston 62 at the corresponding position of the second separate plate 56. The second pressing part 64 applies the axial force to the second separate plate 56 to frictionally couple the second separate plate 56 and the second friction disk 57.

The second receiving part 66 is formed at the radial inner portion of the second piston 62 and is adapted to receive a second release bearing 68.

The shape of the second piston 62 may be determined by those skilled in the art according to the design intention and is not limited to the shape shown in the specification and the drawings.

The second actuating hub 70 transmits the rotational power of the second clutch housing 52 transmitted through the second disk pack 60 to the second output shaft 72. The splines or gear teeth are formed on the inner peripheral surface of the second actuating hub 70 so that the power may be transmitted by engaging with the splines or gear teeth of the second output shaft 72. A bearing 116 is interposed between the radial inner portion of the second actuating hub 70 and the radial inner portion of the first actuating hub 44 to facilitate the relative rotation of the second actuating hub 70 and the first actuating hub 44 and axially support the second actuating hub 70.

The second support part 54 is disposed on the front side of the outer peripheral surface of the second actuating hub 70 to support the second separate plate 56 in the axial direction. Therefore, when the second piston 62 moves to the left side in the drawing, the second support part 54 supports the second separate plate 56 so as to apply the axial force to the second separate plate 56.

The actuator 90 is used for providing operating force (axial force) to the first piston 34 and the second piston 62 and is mounted on the transmission housing rear surface 8 in the transmission housing 4 with fixation bolts 114. To this end, tool holes 121, 122, 123, 124, and 125 are formed in the first clutch housing 22, the first actuating hub 44, the second actuating hub 70, the second piston 62, and the first piston 34, respectively so as to be able to perform work by inserting the fixation bolts 114 into the first clutch housing 22, the first actuating hub 44, the second actuating hub 70, the second piston 62, and the first piston 34. However, coupling the actuator 90 and the transmission housing 4 is not limited to those described in the present specification and drawings.

The actuator 90 includes a first operating part 92 and a second operating part 94. The first operating part 92 is used for providing the axial force to the first piston 34 through the first release bearing 48 and the second operating part 94 is used for providing the axial force to the second piston 62 through the second release bearing 68. In the present specification, it is illustrated that the actuating parts 92 and 94 have a structure in which the pistons are disposed in a cylinder so as to be operated by hydraulic pressure, but the present invention is not limited thereto. That is, any configuration can be used as long as the configuration is capable of providing the axial force to each of the pistons 34 and 62.

A bearing 104 is interposed between the inner peripheral surface of the actuator 90 and the inner portion of the second actuating hub 70 to assist smooth rotation of the second actuating hub 70 and axially and radially support the second actuating hub 70.

The actuator 90 is provided with a first supply passage 96 adapted to supply actuation hydraulic pressure to the first actuating part 92, a second supply passage 97 adapted to supply the actuation hydraulic pressure to the second actuating part 94, and a third supply passage 98 adapted to supply oil for lubrication and cooling to the dual clutch 1 therein. The first supply passage 96 is in fluid communication with the first actuating part 92 and the second supply passage 97 is in fluid communication with the second actuating part 94.

In addition, a passage connection hole 100 and a first lubrication passage 102 are formed in the actuator 90. The passage connection hole 100 is in fluid communication with a third supply passage 98 and supplies the oil to the space between the inner peripheral surface of the actuator 90 and the second output shaft 72 and the second actuating hub 70. The supplied oil lubricates the bearing 104. Further, a sealing member 106 is disposed between the inner peripheral surface of the actuator 90 and the outer peripheral surface of the second output shaft 72 at the rear side of the bearing 104 to prevent the supplied oil from leaking to the outside.

The first lubrication passage 102 is in communication with the passage connection hole 100 and supplies the oil to the space between the second actuating hub 70 and the second piston 62. The oil supplied to the space is radially outward moved by centrifugal force to lubricate and cool the second clutch 50 and the first clutch 20. To this end, discharge passages may be formed in the first clutch housing 22, the first actuating hub 44, the second clutch housing 52, and the second actuating hub 70 corresponding to the first disk pack 32 and the second disk pack 60.

The dual clutch 1 according to the exemplary embodiment of the present invention further includes a front cover 80 for supporting the first clutch housing 22 and preventing the oil supplied to the space in the double clutch 1 from leaking. The front cover 80 is mounted between the transmission housing 4 and the input shaft 2 on the front side of the first clutch housing 22. That is, the outer end of the front cover 80 is mounted on the transmission housing outer peripheral surface 6 and axially supported by a snap ring 84 and the inner end of the front cover 80 is mounted on the input shaft 2. A bearing 86 is mounted between the inner peripheral surface of the front cover 80 and the outer peripheral surface of the input shaft 2 to axially and radially support the first clutch housing 22.

Meanwhile, the oil supplied to the space between the inner peripheral surface of the actuator 90 and the second actuating hub 70 and the space between the second actuating hub 70 and the second piston 62 moves through the gear teeth or the splines or the tool holes 121 to 125 or the discharge passage, lubricates the bearings 116 and 118, and moves to the space between the first clutch housing 22 and the first actuating hub 44. Some of the oil may be used to lubricate the bearing 112 and be discharged to an oil reservoir and some others may be used to lubricate the bearing 86. To this end, a second lubrication passage 120 is formed at a position corresponding to the bearing 86 of the first clutch housing 22 to supply the oil to the bearing 86. Further, a sealing member 88 is mounted between the inner peripheral surface of the front cover 80 and the outer peripheral surface of the input shaft 2 in front of the bearing 86 so as to prevent the oil supplied to the bearing 86 from leaking. In addition, for the same reason, a sealing member 82 is mounted between the outer peripheral surface of the front cover 80 and the outer circumferential surface 6 of the transmission housing.

Hereinafter, an actuation of the dual clutch according to the exemplary embodiment of the present invention will be described in detail.

The power of the crankshaft or the motor shaft is input into the input shaft 2 after the torsional vibration is attenuated through the torsional damper 10. In this case, since the first clutch housing 22 is operatively coupled to the input shaft 2, the first clutch housing 22 rotates together with the input shaft 2. Further, since the second clutch housing 52 is joined to the first connection part 38 of the first piston 34 and the first piston 34 is spline-coupled to the first clutch housing 22, the second clutch housing 52 also rotates together. That is, the input shaft 2, the first clutch housing 22, the first piston 34, and the second clutch housing 52 rotate together by the same rotational power.

In such a state, when the actuating hydraulic pressure is supplied to the first actuating part 92 through the first supply passage 96, the first piston 34 moves axially to the left side in the drawing and applies the axial force to the first separate plate 28. As a result, the first separate plate 28 and the first friction disk 29 are frictionally coupled and the rotational power (that is, the rotational power of the input shaft 2) of the first clutch housing 22 is output to the first output shaft 46 through the first actuating hub 44. In this case, since the second clutch housing 52 joined to the first piston 34 also moves axially to the left side in the drawing, but the second piston 62 and the second friction disk 57 are spline-coupled to the second clutch housing 52, the second piston 62 and the second friction disk 57 do not move in the axial direction. Further, the second separating spring 58 disposed between the neighboring second separate plates 56 maintains the interval between the second separate plates 56. Therefore, the second clutch 50 maintains a disengaged state.

In such a state, when the actuating hydraulic pressure supplied to the first actuating part 92 disappears, the first piston 34 moves to the right side in the drawing due to elastic force of the first separating spring 30. Thus, the first clutch is released.

Simultaneously, when the actuating hydraulic pressure is supplied to the second actuating part 94 through the second supply passage 97, the second piston 62 moves axially to the left side in the drawing and applies the axial force to the second separate plate 56. As a result, the second separate plate 56 and the second friction disk 57 are frictionally coupled and the rotational power (that is, the rotational power of the input shaft 2) of the second clutch housing 52 is output to the second output shaft 72 through the second actuating hub 70.

In such a state, when the actuating hydraulic pressure supplied to the second actuating part 94 disappears, the second piston 62 moves to the right side in the drawing due to the elastic force of the second separating spring 58. Thus, the second clutch is released.

Figure 2:
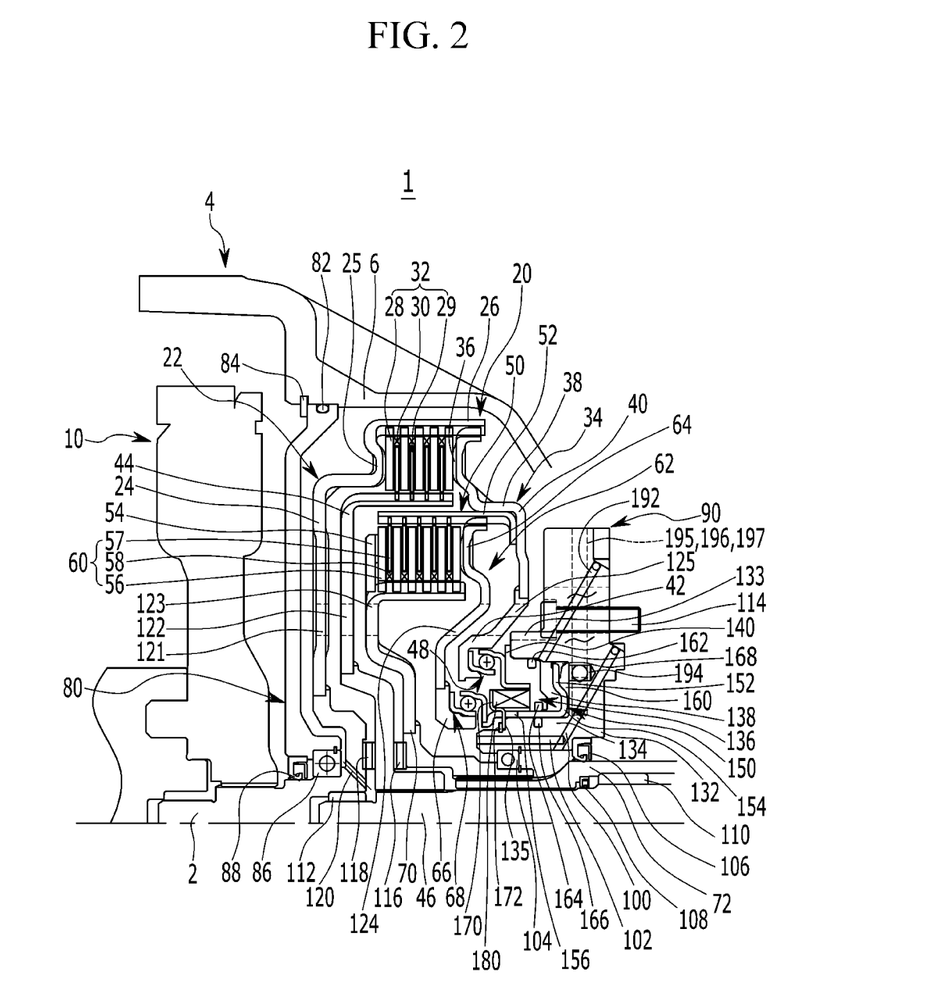
FIG. 2 is a cross-sectional view of a dual clutch according to another exemplary embodiment of the present invention.
Figure 3:
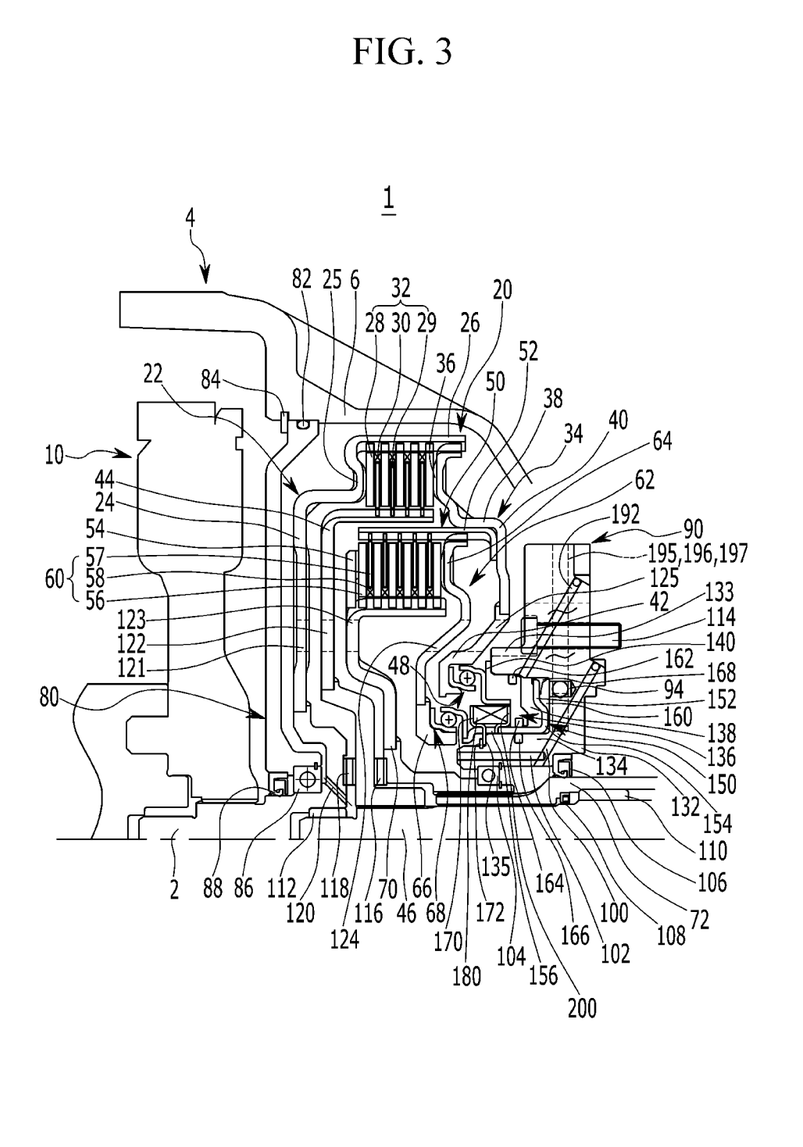
FIG. 3 is a cross-sectional view of a dual clutch according to yet another exemplary embodiment of the present invention.

FIG. 2 is a cross-sectional view of a dual clutch according to another exemplary embodiment of the present invention and FIG. 3 is a cross-sectional view of a dual clutch according to yet another exemplary embodiment of the present invention.

Except for the actuator 90, the dual clutches according to another exemplary embodiment and yet another exemplary embodiment of the present invention have the same component as the dual clutch according to the exemplary embodiment of the present invention. Therefore, only different configurations will be described.

The actuator 90 according to another exemplary embodiment of the present invention includes an actuator housing 132. The actuator housing 132 is formed in a thick disk shape and an actuator housing inner periphery 134 and a housing protrusion 133 outside the radius of the actuator housing inner periphery 134 protrude axially forward to form an actuation piston space on which the first and second actuating pistons 136 and 150 are mounted. A step part 135 having a small diameter is formed on the front side of the actuator housing inner periphery 134.

A bearing 104 is interposed between the inner peripheral surface of the actuator housing 132 and the inner portion of the second actuating hub 70 to assist smooth rotation of the second actuating hub 70 and axially and radially support the second actuating hub 70.

The first actuating piston 136 is used for providing the axial force to the first piston 34 through the first release bearing 48 and the second actuating piston 150 is used for providing the axial force to the second piston 62 through the second release bearing 68.

The second actuating piston 150 includes a second actuating piston inner periphery 154 mounted in a radial space between the actuator housing inner periphery 134 and the housing protrusion 133 and extending axially and a second actuating piston disk part 152 extending radially outward from the rear end of the second actuating piston inner periphery 154. Further, the first actuating piston 136 is mounted in the radial space between the second actuating piston inner periphery 154 and the housing protrusion 133 and is disposed in the axial front side of the second actuating piston 150. A first actuating piston chamber 138 is formed among the first actuating piston 136, the second actuating piston inner periphery 154, and the housing protrusion 133 and a second actuating piston chamber 160 is formed between the first actuating piston 150 and the actuator housing 132.

The first actuating piston 136 is operatively connected to the first release bearing 48 and moves axially forward by the actuating hydraulic pressure supplied to the first actuating piston chamber 138 to apply the axial force to the first release bearing 48. Sealing members 162 and 164 may be mounted between the outer circumferential surface of the first actuating piston 136 and the housing protrusion 133 and between the inner peripheral surface of the first actuating piston 136 and the second actuating piston inner periphery 154, respectively in order to maintain airtightness of the first actuating piston chamber 138. Further, a stopper 140 protruding radially outward is formed on the front side of the first actuating piston 136. The stopper 140 abuts on the end of the housing protrusion 133 when the actuating hydraulic pressure supplied to the first actuating piston chamber 138 is discharged and the first actuating piston 136 moves axially rearward, thereby restricting axial rearward movement of the first actuating piston 136.

The second actuating piston 150 extends axially forward beyond the first actuating piston 136 and is operatively connected to the second release bearing 48. Accordingly, the second actuating piston 150 moves axially forward by the actuating hydraulic pressure supplied to the second actuating piston chamber 160 and applies the axial force to the second release bearing 68. In order to maintain the airtightness of the second operating piston chamber 160, sealing members 166 and 168 may be mounted between the second actuating piston inner periphery 154 and the inner periphery 134 of the actuator housing and between an outer diameter end of the second actuating piston disk part 152 and the housing protrusion 133, respectively.

The actuator housing 132 is provided with a first supply passage 195 and a first supply hole 192 adapted to supply the actuation hydraulic pressure to the first actuating piston chamber 138, a second supply passage 196 and a second supply hole 194 adapted to supply the actuation hydraulic pressure to the second actuating piston chamber 160, and a third supply passage 197 adapted to supply the oil for lubrication and cooling to the dual clutch 1 therein. The first supply passage 195 and the first supply hole 192 are in fluid communication with the first actuating piston chamber 138 and the second supply passage 196 and the second supply hole 194 are in fluid communication with the second actuating piston chamber 160. The first, second, and third supply passages 195, 196, and 197 may be located at different positions along a circumferential direction and may not be in communication with each other. As a result, the oil supplied to the first, second, and third supply passages 195, 196, and 197 may be independently controlled. On the other hand, in order to smoothly perform the alternate actuation of the first and second clutches 20 and 50, the first and second supply passages 195 and 196 are supplied with oil from one oil supply source and herein, the oil may be supplied by switching a flow path of a switching valve mounted on an oil supply route. Even in this case, the oil supplied to the third supply passage 197 may be independently controlled.

Further, the passage connection hole 100 and the first lubrication passage 102 are formed in the actuator housing 132. The passage connection hole 100 is in fluid communication with a third supply passage 197 and supplies the oil to the space between the inner peripheral surface of the actuator housing inner peripheral surface 134 and the second output shaft 72 and the second actuating hub 70. The supplied oil lubricates the bearing 104. Further, the sealing member 106 is disposed between the actuator housing inner peripheral surface 134 and the outer peripheral surface of the second output shaft 72 at the rear side of the bearing 104 to prevent the supplied oil from leaking to the outside.

The first lubrication passage 102 is in communication with the passage connection hole 100 and supplies the oil to the space between the second actuating hub 70 and the second piston 62. The oil supplied to the space is radially outward moved by centrifugal force to lubricate and cool the second clutch 50 and the first clutch 20. To this end, discharge passages may be formed in the first clutch housing 22, the first actuating hub 44, the second clutch housing 52, and the second actuating hub 70 corresponding to the first disk pack 32 and the second disk pack 60.

The actuator 90 further includes a return spring 180 and a spring seat 170.

The return spring 180 is supported by the spring seat 170 and provides the elastic force against the axial force by the actuating hydraulic pressure supplied to the first actuating piston chamber 138 to the first actuating piston 136.

The spring seat 170 is mounted on the actuator housing inner peripheral surface 134. In one exemplary embodiment, at least one mounting hole 156 is formed along the circumferential direction in the second actuating piston inner periphery 134 and at least one spring seat 170 passes through the mounting hole 156 to be in contact with the step part 135 formed in the actuator housing inner periphery 134. As a result, the spring seat 170 is restricted from moving axially rearward. Further, in order to restrict axial forward movement of the spring seat 170, a snap ring 172 is fixedly mounted on the actuator housing inner periphery 134 by contacting the spring seat 170 on the front side of the spring seat 170.

Meanwhile, as illustrated in FIG. 3, the return spring 180 may be brought into contact with an additional spring seat 200 instead of contacting the first actuating piston 136. In this case, at least a part of the additional spring seat 200 is inserted into the mounting hole 156, and as a result, the additional spring seat 200 is mounted to be movable in the axial direction. The additional spring seat 200 is adapted to move in the axial direction together with the first actuating piston 136 by the axial force of the first actuating piston 136 and the elastic force of the return spring 180. In this case, the mounting hole 156 has a diameter capable of ensuring a movement range of the additional spring seat 200 moving together with the first actuating piston 136. Further, the additional spring seat 200 is adapted to move in the axial direction together with the second actuating piston 150 by the axial force of the second actuating piston 150 and the elastic force of the return spring 180, and as a result, when the hydraulic pressure is not applied to the second actuating piston 150, the additional spring seat 200 may return to an original position.

The dual clutch 1 according to another exemplary embodiment of the present invention further includes a front cover 80 for supporting the first clutch housing 22 and preventing the oil supplied to the space in the double clutch 1 from leaking. The front cover 80 is mounted between the transmission housing 4 and the input shaft 2 on the front side of the first clutch housing 22. That is, the outer end of the front cover 80 is mounted on the transmission housing outer peripheral surface 6 and axially supported by a snap ring 84 and the inner end of the front cover 80 is mounted on the input shaft 2. A bearing 86 is mounted between the inner peripheral surface of the front cover 80 and the outer peripheral surface of the input shaft 2 to axially and radially support the first clutch housing 22.

Meanwhile, the oil supplied to the space between the inner peripheral surface of the actuator housing 132 and the second actuating hub 70 and the space between the second actuating hub 70 and the second piston 62 moves through the gear teeth or the splines or the tool holes 121 to 125 or the discharge passage, lubricates the bearings 116 and 118, and moves to the space between the first clutch housing 22 and the first actuating hub 44. Some of the oil may be discharged to an oil reservoir while lubricating the bearing 112 and other some may be used to lubricate the bearing 86. To this end, a second lubrication passage 120 is formed at a position corresponding to the bearing 86 of the first clutch housing 22 to supply the oil to the bearing 86. Further, a sealing member 88 is mounted between the inner peripheral surface of the front cover 80 and the outer peripheral surface of the input shaft 2 in front of the bearing 86 so as to prevent the oil supplied to the bearing 86 from leaking. In addition, for the same reason, a sealing member 82 is mounted between the outer circumferential surface of the front cover 80 and the outer circumferential surface 6 of the transmission housing.

Hereinafter, the actuation of the dual clutch according to another exemplary embodiment of the present invention will be described in detail.

The power of the crankshaft or the motor shaft is input into the input shaft 2 after the torsional vibration is attenuated through the torsional damper 10. In this case, since the first clutch housing 22 is operatively coupled to the input shaft 2, the first clutch housing 22 rotates together with the input shaft 2. Further, since the second clutch housing 52 is joined to the first connection part 38 of the first piston 34 and the first piston 34 is spline-coupled to the first clutch housing 22, the second clutch housing 52 also rotates together. That is, the input shaft 2, the first clutch housing 22, the first piston 34, and the second clutch housing 52 rotate together by the same rotational power.

In such a state, when the actuating hydraulic pressure is supplied to the first actuating piston chamber 138 through the first supply passage 195 and the first supply hole 192, the first actuating piston 136 moves to the left side in the drawing and pushes the first release bearing 48 to the left side in the drawing. In this case, the actuating hydraulic pressure supplied to the first actuating piston chamber 138 pushes the second actuating piston 150 to the right side in the drawing to bring the second actuating piston 150 into contact with the front surface of the actuator housing 132, and as a result, the actuating hydraulic pressure that is supplied to the second actuating piston chamber 160 is smoothly discharged. Further, the first piston 34 moves in the axial direction to the left side in the drawing and applies the axial force to the first separate plate 28. As a result, the first separate plate 28 and the first friction disk 29 are frictionally coupled and the rotational power (that is, the rotational power of the input shaft 2) of the first clutch housing 22 is output to the first output shaft 46 through the first actuating hub 44. In this case, since the second clutch housing 52 joined to the first piston 34 also moves axially to the left side in the drawing, but the second piston 62 and the second friction disk 57 are spline-coupled to the second clutch housing 52, the second piston 62 and the second friction disk 57 do not move in the axial direction. Further, the second separating spring 58 disposed between the neighboring second separate plates 56 maintains the interval between the second separate plates 56. Therefore, the second clutch 50 maintains the disengaged state.

In such a state, when the actuating hydraulic pressure supplied to the first actuating piston chamber 138 disappears, the first piston 34 moves to the right side in the drawing due to elastic force of the first separating spring 30. Thus, the first clutch is released. Further, the first actuating piston 136 moves to the right side in the drawing by the elastic force of the first separating spring 30 transmitted to the first actuating piston 136 through the first release bearing 48 and the elastic force of the return spring 180. Accordingly, the actuating hydraulic pressure supplied to the first actuating piston chamber 138 is smoothly discharged. In this case, a distance at which the first actuating piston 136 may move axially rearward by the stopper 140 is restricted.

Simultaneously, when the actuating hydraulic pressure is supplied to the second actuating piston chamber 160 through the second supply passage 196 and the second supply hole 194, the second actuating piston 150 moves to the left side in the drawing and pushes the second release bearing 68 to the left side in the drawing. In this case, a volume of the first actuating piston chamber 138 is reduced and the actuating hydraulic pressure supplied to the first actuating piston chamber 138 is smoothly discharged. Further, the second piston 62 moves in the axial direction to the left side in the drawing and applies the axial force to the second separate plate 56. As a result, the second separate plate 56 and the second friction disk 57 are frictionally coupled and the rotational power (that is, the rotational power of the input shaft 2) of the second clutch housing 52 is output to the second output shaft 72 through the second actuating hub 70.

In such a state, when the actuating hydraulic pressure supplied to the second actuating part 194 disappears, the second piston 62 moves to the right side in the drawing due to the elastic force of the second separating spring 58. Thus, the second clutch is released. Further, the second actuating piston 150 moves to the right side in the drawing by the elastic force of the second separating spring 58 transmitted to the second actuating piston 136 through the second release bearing 68. Accordingly, the actuating hydraulic pressure supplied to the second actuating piston chamber 160 is smoothly discharged.

Meanwhile, as illustrated in FIG. 3, when the additional spring seat 200 is movably mounted in the mounting hole 156, in the case where the second actuating piston 150 moves to the left side in the drawing, the additional spring seat 200 compresses the return spring 180 and in the case where the second actuating piston 150 moves to the right side in the drawing, the additional spring seat 200 transmits the elastic force of the return spring 180 to the second actuating piston 150. Accordingly, the actuating hydraulic pressure supplied to the second actuating piston chamber 160 is smoothly discharged by the elastic force of the return spring 180.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A dual clutch outputting rotational power of an input shaft to a first output shaft or a second output shaft, the dual clutch comprising:

a cylindrical transmission housing having a space therein;
a first clutch disposed at a radial outer side within the transmission housing and adapted to selectively transmit the rotational power of the input shaft to the first output shaft; and
a second clutch disposed at the radial inner side of the first clutch within the transmission housing and adapted to selectively transmit the rotational power of the input shaft to the second output shaft,
wherein the dual clutch further includes a first piston selectively actuating the first clutch,
the first piston is adapted to continuously transmit the rotational power of the input shaft transmitted to the first clutch to the second clutch, and
wherein the rotational power of the input shaft is transmitted by only one of the first clutch and the second clutch at a time.

2. The dual clutch of claim 1, wherein:
the first clutch includes a first clutch housing operatively connected to the input shaft and rotating together with the input shaft, and
the second clutch includes a second clutch housing operatively connected to the first clutch housing through the first piston and rotating together with the first clutch housing.

3. The dual clutch of claim 2, wherein:
the first piston is spline-coupled to an inner peripheral surface of the first clutch housing and the second clutch housing is joined to the first piston.

4. The dual clutch of claim 2, wherein:
the first clutch housing includes a first disk part coupled to the input shaft on an inner end thereof and extending radially outward and a first cylinder part extending axially rearward from an outer end of the first disk part, and
the first clutch includes
a plurality of first separate plates spline-coupled to an inner peripheral surface of the first cylinder part,
a first actuating hub operatively coupled to the first output shaft, and
a plurality of first friction disks spline-coupled to an outer peripheral surface of the first actuating hub and disposed alternately with the plurality of first separate plates.

5. The dual clutch of claim 4, wherein:
the first clutch further includes at least one first separating spring disposed between neighboring first separate plates at a radial outer side of the plurality of first friction disks.

6. The dual clutch of claim 4, wherein:
the second clutch housing is joined to the first piston at a radial inner side of the first clutch, and
the second clutch includes
a plurality of second friction disks spline-coupled to an inner peripheral surface of the second clutch housing,
a second actuating hub operatively coupled to the second output shaft, and
a plurality of second separate plates spline-coupled to an outer peripheral surface of the second actuating hub and disposed alternately with the plurality of second friction disks.

7. The dual clutch of claim 6, wherein:
the second clutch further includes at least one second separating spring disposed between neighboring second separate plates at the radial inner side of the plurality of second friction disks.

8. The dual clutch of claim 6, wherein:
a second support part axially supporting the second separate plate is formed on a front outer peripheral surface of the second actuating hub and an outer end of a second piston adapted to provide the axial force to the second separate plate is spline-coupled to a rear inner peripheral surface of the second clutch housing.

9. The dual clutch of claim 6, wherein:
a front cover is mounted between the transmission housing and the input shaft at an axial front side of the first clutch housing.

10. The dual clutch of claim 9, wherein:
a sealing member and a bearing are mounted between an inner peripheral surface of the front cover and an outer peripheral surface of the input shaft sequentially from a front side to a rear side.

11. The dual clutch of claim 10, wherein:
a second lubrication passage for supplying lubrication oil to the bearing is formed at a position of the first clutch housing corresponding to the bearing.

12. The dual clutch of claim 6, wherein:
a bearing is mounted between an inner peripheral surface of an actuator and an inner periphery of the second actuating hub and a sealing member is formed between the inner peripheral surface of the actuator and an outer peripheral surface of the second output shaft at a rear side of the bearing.

13. The dual clutch of claim 12, wherein:
a passage connection hole for supplying lubrication oil to the bearing is formed in the actuator.

14. The dual clutch of claim 6, wherein:
bearings are disposed between an inner periphery of the first clutch housing and an inner periphery of the first actuating hub and between the inner periphery of the first actuating hub and an inner periphery of the second actuating hub, respectively.

15. The dual clutch of claim 1, further comprising:
an actuator disposed in the transmission housing and providing actuation force to the first piston and a second piston selectively actuating the second clutch,
wherein the actuator includes
a first actuating part providing the actuation force to the first piston through a first release bearing, and
a second actuating part providing the actuation force to the second piston through a second release bearing.

16. The dual clutch of claim 1, further comprising:
an actuator disposed in the transmission housing and providing the actuation force to the first piston and the second piston selectively actuating the second clutch,
wherein the actuator includes
an actuator housing including an inner periphery and a protrusion of the actuator housing, which are radially spaced apart from each other and protrude axially and forming an actuating piston space between the inner periphery and the protrusion of the actuator housing,
a first actuating piston mounted in the actuating piston space and providing the axial force to the first piston through a first release bearing, and
a second actuating piston mounted in the actuating piston space and providing the actuation force to the second piston through a second release bearing.

17. The dual clutch of claim 16, wherein:
the second actuating piston includes a second actuating piston inner periphery which is in close contact with an inner periphery of the actuator housing and extends axially and a second actuating piston disk part which extends radially outward from a rear end of the inner periphery of the second actuating piston and is in close contact with the protrusion of the actuator housing, and
the inner peripheral surface of the first actuating piston is in close contact with the inner periphery of the second actuating piston and an outer peripheral surface is in close contact with the housing protrusion.

18. The dual clutch of claim 17, wherein:
the actuator further includes a return spring for providing elastic force to the first actuating piston, and
the return spring is axially supported by at least one spring seat fixedly mounted on the inner periphery of the actuator housing.

19. The dual clutch of claim 18, wherein:
at least one mounting hole is formed in a circumferential direction in the inner periphery of the second actuating piston and a step part having a small diameter is formed on the inner periphery of the actuator housing, and
at least one spring seat is mounted on the inner periphery of the actuator housing by penetrating the at least one mounting hole and axially supported by the step part and a snap ring.

20. The dual clutch of claim 19, wherein:
the actuator further includes an additional spring seat interposed between the first return spring and the first actuating piston at an opposite side to the spring seat, and
at least a part of the additional spring seat is inserted into the mounting hole and mounted to be movable axially.

* * * * *